United States Patent [19]

Sundet

[11] Patent Number: 4,783,346
[45] Date of Patent: Nov. 8, 1988

[54] PROCESS FOR PREPARING COMPOSITE MEMBRANES

[75] Inventor: Sherman A. Sundet, Wilmington, Del.

[73] Assignee: E. I. Du Pont de Nemours and Company, Wilmington, Del.

[21] Appl. No.: 131,379

[22] Filed: Dec. 10, 1987

[51] Int. Cl.$^4$ .................... B01D 25/04; B01D 29/40; B05D 5/00
[52] U.S. Cl. .................... 427/244; 210/490; 210/500.37; 210/500.38; 210/500.41; 427/412.1
[58] Field of Search .............. 210/490, 500.37, 500.38, 210/500.41; 427/244, 412.1

[56] References Cited

U.S. PATENT DOCUMENTS

| 3,567,632 | 3/1971 | Richter et al. | 210/23 |
| 4,277,344 | 7/1981 | Cadotte | 210/654 |
| 4,520,044 | 5/1985 | Sundet | 427/244 |
| 4,529,646 | 7/1985 | Sundet | 428/315.5 |
| 4,626,468 | 12/1986 | Sundet | 428/315.5 |

FOREIGN PATENT DOCUMENTS 0211633  2/1987  European Pat. Off. .

Primary Examiner—Michael Lusignan

[57] ABSTRACT

A multistage process for preparing interfacially polymerized polyamide reverse osmosis membranes on a microporous support is disclosed. The process involves applying a solution containing from 1 to 10 wt % of an aromatic diamine having 1 or 2 aromatic rings and 2 to 3 amino groups in a first solvent to the microporous substrate. Then a solution of an aromatic or cyclophatic acyl chloride having 1 or 2 rings and 2.2 to 4 acyl chloride groups in a solvent immiscible with the first solvent is applied to the microporous substrate. Then a solution of different acyl chlorides is applied to the substrate. The acyl chlorides in this second solution can have 2 to 4 acyl chloride groups attached to an aliphatic group of 6 to 12 carbon atoms or an aromatic or cycloaliphatic group having 1 or 2 rings and containing 8 to 14 carbon atoms. Also suitable for the second treatment are bis chloroformates.

7 Claims, No Drawings

PROCESS FOR PREPARING COMPOSITE MEMBRANES

FIELD OF THE INVENTION

The present invention relates to a multistage interfacial polymerization process for preparing thin film composite reverse osmosis membranes.

PRIOR ART

Permselective membranes suitable for use in desalination of aqueous solutions and other separations of solutes or entrained solids from liquids are the subject of numerous patents. Richter et al., U.S. Pat. No. 3,567,632, discloses membranes made of organic nitrogen-linked aromatic polymers. Cadotte, U.S. Pat. No. 4,277,344 discloses permselective composite membranes in which there is a microporous polysulfone substrate layer and a superposed polyamide layer made from an aromatic triacid halide, such as trimesyl chloride, and an aromatic diamine, such as m-phenylene diamine. Published European Patent Application No. 0 211 633 discloses semipermeable composite membranes in which there is a microporous polysulfone support layer and a superposed crosslinked polyamide layer formed by interfacial polymerization. In the polyamide layer at least 5% of the polyamine residues are

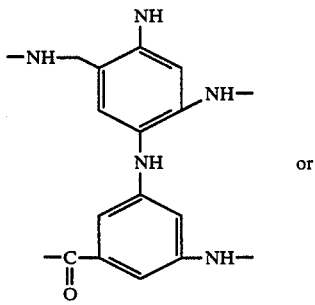

In Examples 14 and 26 the application discloses a rinse of the interfacially-polymerized membrane with 1,1,2-trichloro-1,2,2-trifluoroethane. Sundet, U.S. Pat. No. 4,626,468, discloses composite reverse osmosis membranes comprising a microporous polysulfone support layer and superposed thereon an interfacially-polymerized partially aromatic copolyamide. The partially aromatic copolyamide is derived from m-phenylene diamine and based on polymerized acid chloride present, 10 to 80 wt. % trimesyl chloride, 90 to 15 wt. % cyclohexane-1,3,5-tricarbonyl chloride and up to 40 wt. % isophthalyl chloride, terephthalyl chloride or mixtures thereof.

SUMMARY OF THE INVENTION

The present invention involves applying a dilute solution of a monomeric polyamine to a microporous substrate such as a microporous polysulfone, which itself may be on a woven or non-woven support. Any excess of the solution is removed and a dilute solution of a polyfunctional acyl chloride in a solvent, immiscible with the solvent used to apply the polyamine, is applied to the microporous substrate. Then the substrate is drained and a solution of a further acyl chloride is applied to the substrate and allowed to react with the interfacially-formed polyamide membrane associated with the substrate. This second reaction results in a membrane having improved salt rejection with only a minor loss in flux.

DETAILED DESCRIPTION

The procedures of Cadotte U.S. Pat. No. 4,277,344 or Sundet U.S. Pat. Nos. 4,520,044 or 4,529,646 are illustrative of the conditions needed for preparing composite membranes of this type. The process consists essentially of several steps:

A microporous substrate with pores less than 40 nm. in diameter is prepared. This may be accomplished with a polysulfone, cast from a 15% by weight solution thereof in dimethylformamide and immediately quenched in water to precipitate the polysulfone and extract the solvent.

This substrate (dried and stored, or fresh and wet) is then loaded with an aqueous solution of the aromatic diamine at a concentration of 0.5–10% by weight, preferably 1–3% by weight in the water, and the excess solution removed from the surface by some draining, rolling or sponging procedure. The concentration of the diamine is an important factor in the performance of the resulting composite.

If desired the cast polysulfone can be quenched in an aqueous solution containing 0.1–10% by weight, preferably 0.5–5% by weight and most preferably 1–3% by weight aromatic diamine. This technique often produces a composite membrane superior to that obtained using the two-step aqueous quench followed by loading with diamine process described above.

The loaded substrate is then immersed in a 0.05 to 0.5 wt. % solution of acid chlorides, which may be mixed acid chlorides in a liquid such as Freon ® TF, chlorofluoro carbon liquid, or hexane or mixtures thereof (solvents which do not adversely affect the porous structure of the polysulfone substrate) for 5–90, preferably 10–35 secs. at room temperature. Formation of the polyamide causes the originally shiny substrate to have a dull finish. The process up to here is in the prior art.

In the present invention the thus reacted substrate is then immersed in a 0.01 to 0.5 wt. % solution of a different acid chloride or mixed acid chlorides which may be either

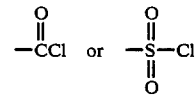

to improve the salt rejection of the membrane while the loss of Ku is small, often negligible.

The resulting composite is then dried at temperatures of 20°–100° C., preferably 50°–70° C., for periods of 5–180 secs., preferably 15–60 secs., to establish adhesion of the surface polyamide to the polysulfone substrate. The composite also can be dried for 5–15 minutes at 20°–25° C.

The residual diamine and reaction byproducts are extracted by soaking in water, alcohol solutions, etc.

Initial polyamide formation as a heterogeneous deposit on the substrate (polysulfone) surface is very rapid, and the morphology is largely determined by the concentration and identity of the reactants. The separation of a polyamide framework from solution preferably occurs within 1–3 seconds of interfacial contact. Subsequent reaction is limited in rate by the slower diffusion of reactants through this polyamide film, but may be expected to continue until all residual acid chloride functions have reacted with diamine or water. Thus changes in the polyamide layer may be expected to occur through and into subsequent draining, drying and extraction steps.

While a rather high level of branching (an average functionality of perhaps 2.2 or higher) is needed in the initial phase of the reaction, this is not required in later stages and average functionalities of 2-3 have been used to advantage with lower concentrations of acid chloride in the final stages. We have therefore found advantage in the use of bifunctional acid chlorides in the final stages of polyamide formation.

Key parameters for the later stages of the reaction then are the identity, functionality, and concentration of the acid chlorides employed, and the time of reaction allowed. Acid chloride functionalities from 2 to 3 and even 4 can be used and concentrations of 0.01 to 1% v/v may on occasion be useful. The concentration of the acid chloride needed will depend on the availability of the diamine diffusing through the polyamide layer. Times of reaction have been from 1 to 120 seconds. Aliphatic as well as aromatic acid chlorides have been employed with success.

It is to improve the properties, particularly salt rejection of the polyamide formed during the later stages of reaction that we change the identity and functionality of the acid chloride for the later stages of reaction, including those which occur during and subsequent to drying. The advantage of extracting the low molecular weight products formed during these stages has already been claimed.

Suitable amines for use herein include aromatic amines containing 6-14 carbon atoms, one or two aromatic rings, and two to three and even four amino groups. Meta-phenylene diamine is the preferred amine for use herein.

The two ring diamines suitable for use herein generally have the formula:

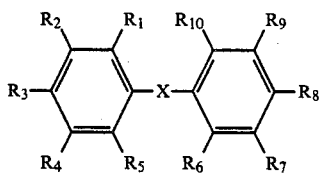

where $R_1$–$R_{10}$ represent a reactive amino group or other substituent. Other substituents than the amino groups in the formula (I) may be any of substituents that do not hinder the formation of the amide link between monomeric units for instance —H, —OCH, —CH$_3$, —C$_2$H$_5$, —C$_3$H$_7$, —SO$_3$H, —COOH, —NHCH$_3$, —OH, —COCH$_3$, —F, —Cl, —I. Hydrophilic substituents such as —H, —OCH$_3$, —SO$_3$H, —COOH, and —OH are preferable for increase in water permeability. The symbol X in formula (I) means a single bond between two aromatic rings, or alternatively may be any of the divalent groups capable of bonding two aromatic rings, for instance, —NHCO—, —SO$_2$—, —S—, —CO—, —CH$_2$—,

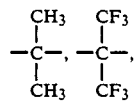

—O—. Oxygen containing groups are preferred for their interaction with water.

Suitable acid chlorides for use in the first reaction stage are aromatic acid chlorides containing 8 to 16 carbon atoms and containing two or three acid chloride groups. Also suitable are acid chlorides derived from cyclohexane containing two or three acid chloride groups.

The two ring acid chlorides suitable for use herein generally have the formula

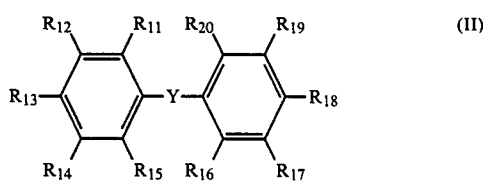

wherein $R_{11}$–$R_{20}$ represent acyl chloride groups or other substituent. The substituents other than acyl chloride in the compound of formula (II) may be any substituents that do not hinder the formation of amide links between monomeric units, for instance, —H, —OCH$_3$, —C$_2$H$_5$, —C$_3$H$_7$, —COCH$_3$, —F, —Cl, —Br and —I. The symbol Y in formula (II) means a single bond between two aromatic rings or alternatively may be any of the divalent groups capable of bonding two aromatic rings for example —NHCO—, —SO$_2$—, —S—, —CO—,

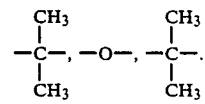

Suitable acid chlorides for use in the second and subsequent reaction stages include those suitable for use in the first reaction stage plus aliphatic acid chlorides containing 6 to 12 carbon atoms. The acid chlorides may be either carboxylic acid chlorides or sulfonyl chlorides. Also suitable are bis-chloroformates such as resorcinol bis-chloroformate, hydroquinone bis-chloroformate, 2,4,6-trichlororesorcinol bischloroformate, and 2,2-dichlorobisphenol AF bischloroformate. Especially preferred for use in the second stage are the aromatic carboxylic acid chlorides.

In a preferred embodiment the microporous substrate is a polysulfone and the pore size of polysulfone is less than about 20 nanometers in diameter.

In the membranes of this invention the microporous substrate will normally be about 0.5 to 5 mils thick, and the copolyamide layer will normally be about 20 to 200 nanometers thick.

DESCRIPTION OF THE PREFERRED EMBODIMENTS

Example 1

Simple FREON Rinse vs. Lowered Concentrations of 1,3,5-Cyclohexanetricarbonyl Chloride (HTMesCl)

A 16% solution of Udel P3500 polysulfone resin, derived from bisphenol A and 4, 4' dichlorophenyl sulfone having a molecular weight of about 35,000 in dimethylformamide containing 0.2% Gafac RE610, a complex organic phosphate ester, was cast with a knife setting of six mils ($1.5 \times 10^{-4}$ m) on a continuous web of polyester fabric Texlon 0715 under ambient conditions of 72° C. and 30% relative humidity. Quenched within three seconds in water at 6° C., it was extracted for three minutes in water at 10° C.

The microporous substrate so prepared was extracted with 0.1 w/v% aqueous dimethylformamide for five minutes, then loaded by immersion in 1.4 w/v% aqueous m-phenylenediamine for three minutes. The surface of the substrate was rolled free of aqueous droplets with a soft sponge rubber roller and immersed for fifteen seconds in the first stage acid chloride solutions in FREON TF (1,2,2-trichloro-1,1,2-trifluoroethane) as indicated in Table I below. After two or three seconds draining, they were then immersed in the second stage solution, either FREON TF or the more dilute solution indicated, for fifteen seconds more. The membranes were then dried in the laboratory air (22° C., 47% RH) for five minutes before extraction: five minutes in 15% ethanol at 25° C., five minutes in 10% ethanol at 45° C., five minutes in 5% ethanol at 65° C., and finally five minutes in water at 75° C. They were stored in deionized water at room temperature for testing with 2.2 wt.% aqueous sodium chloride at a feed pressure of 225 psi. Results obtained after 17–24 hours on test are shown in Table I below.

TABLE I

| First Stage Reaction | Second Stage Reaction | Salt Passage | Flux Constant Kw m/s/TPa |
| --- | --- | --- | --- |
| 0.1 w/v % HTMesCl + 0.02% TCl | FREON TF only | 1.35% | 8.69 |
| As above | 0.03 w/v % HTMesCl | 1.17% | 7.77 |
| 0.085 w/v % HTMesCl + 0.035 w/v % TCl* | FREON TF only | 1.53% | 10.38 |
| As above | 0.03 w/v % HTMesCl | 1.21% | 10.9 |

*Terephthalyl Chloride

The results illustrate the improvement in salt passage gained by the second stage reaction with the acid chloride.

Example 2

The Bifunctional Terephthalyl Chloride vs Simple FREON TF Rinse

A 16% solution of Udel P3500 polysulfone resin in dimethylformamide containing 0.2% Gafac RE610 and 0.6% water ws prepared and filtered through a 0.2 micron filter. It was cast on a glass plate at a setting of six mils and quenched within seven seconds in an aqueous solution containing 2% dimethylformamide and 15% formic acid. After extraction in water at room temperature for three minutes, this microporous substrate was loaded by immersion in 1.4% aqueous m-phenylenediamine for three minutes. The surface was then rolled free of aqueous droplets with a soft sponge rubber roller and the substrate immersed in a solution of 1,3,5-cyclohexane-tricarbonyl chloride in FREON TF for ten seconds. For the second stage of reaction, the membrane was immersed as indicated below for twenty seconds more, then dried for thirty minutes in laboratory air. After storing in deionized water overnight the membranes were annealed in water at 78° C. for five minutes. They were tested under standard conditions to give the results reported in Table II.

TABLE II

| Second Stage | SP, % | Kw, m/s/TPa |
| --- | --- | --- |
| FREON TF only | 2.37 | 11.96 |
| 0.03% TCl in FREON TF | 1.69 | 8.78 |

Example 3

Effect of Second Stage in Trimethyl Chloride System

A 15% solution of Udel P3500 polysulfone resin in dimethylformamide containing 0.2% Gafac RE610 and 0.3% water was filtered through a 0.2 micron filter, then cast on a glass plate using a knife setting of 6 mils. After six seconds of drying, the casting was quenched in 2% dimethylformamide for two minutes, then loaded by immersion in 1.4% m-phenylenediamine for four minutes. After stripping the surface of aqueous droplets with a soft sponge rubber roller, the substrate was immersed in a solution of 0.12% w/v of trimesyl chloride in FREON TF for ten seconds. After reaction the membranes were dried for thirty minutes in the laboratory air, then extracted in water at 72° C. for three minutes. They were stored in deionized water for testing by the procedures described above. The results are reported in Table III.

TABLE III

| Second Stage | SP, % | Kw, m/s/TPa |
| --- | --- | --- |
| None | 0.68 | 8.53 |
| 0.02% w/v TMesCl in FREON TF | 0.46 | 7.06 |

Example 4

Other Second Stage Reactants in a Cyclohexanetricarboxamide System

A 16% solution of Udel P3500 polysulfone resin in dimethylformamide containing 0.2% Gafac RE610 and 0.6% water was prepared and filtered through a 0.2 micron filter. It was cast on a glass plate with a Gardner knife set to six mils, the casting dried for two or three seconds, then quenched in 2% dimethylformamide for one minute. The microporous substrate so obtained was extracted with water for three minutes, then loaded by immersion in 1.4% aqueous m-phenylenediamine for three minutes. After removal of the surface droplets with a soft sponge rubber roller, this substrate was reacted with a solution of 0.12% w/v of 1,3,5-cyclohexanetricarbonyl chloride in FREON TF for 15 seconds then with a second reactant as indicated in FREON TF for another 15 seconds. After drying in the laboratory air for twenty minutes the membranes were extracted in deionized water overnight at room temperature, then at 45° C. for thirty minutes, and finally at 78° C. for five minutes. After testing under the standard conditions described above, the results obtained are reported in Table IV.

TABLE IV

| Second Reactant | w/v % | SP, % | Kw |
|---|---|---|---|
| 1,3,5-Cyclohexanetricarbonyl chloride | 0.03 | 1.76 | 10.1 |
| As above | 0.03 | 1.82 | 11.5 |
| As above | 0.03 | 1.73 | 8.2 |
| 1,4-Cyclohexanedicarbonyl chloride | 0.02 | 1.38 | 10.1 |
| 2,4,6-Trichlororesorcinol bischloroformate | 0.10 | 1.31 | 4.8 |
| 2,2'-Dichlorobisphenol AF bischloroformate | 0.10 | 1.24 | 6.4 |

Example 5

Aromatic and Aliphatic Diacid Chlorides on a Trimesamide System

Microporous polysulfone substrates prepared as in Example 3 with three seconds drying were loaded by immersion in 2.8% aqueous m-phenylenediamine for four minutes. After the removal of surface droplets by rolling with a soft sponge rubber roller, the membranes were immersed in a solution of 0.12% w/v of trimesoyl-chloride in FREON TF for ten seconds, then treated with a second stage of reaction as shown in the table below. After the second stage the membranes were dried for thirty minutes at room temperature, extracted for three minutes in water at 86° C. and stored in deionized water for testing by the standard procedures.

TABLE V

| Acid Chloride | % w/v | Time, Sec | SP, % | Kw |
|---|---|---|---|---|
| Isophthaloyl | 0.2 | 30 | 2.35 | 1.95 |
|  |  | 120 | 0.62 | 1.97 |
|  | 0.4 | 30 | 1.11 | 0.95 |
| Adipyl | 0.2 | 30 | 4.74 | 5.55 |
|  |  | 120 | 1.18 | 5.47 |
|  | 0.4 | 30 | 0.49 | 5.29 |

The data illustrate the important effect of concentration, time of reaction and identity of the acid chloride in the changes developed during the second state of reaction.

Example 6

Aliphatic Acid Chloride with the Cyclohexane System

The microporous polysulfone substrate was prepared as in Example 4 with the exception that is was quenched in 5% dimethylformamide for one minute and then extracted in deionized water for three minutes before loading by immersion in aqueous m-phenylenediamine for three minutes as indicated in the table below. After removal of surface droplets by rolling with a soft sponge rubber roller, the substrates were immersed in a solution of 0.12% w/v of 1,3,5-cyclohexane-tricarbonyl chloride in FREON TF for ten seconds, then reacted with adipyl chloride in FREON TF as shown in the table. The membranes were drained briefly, then dried at room temperature for thirty minutes, extracted in deionized water overnight and finally annealed for five minutes in water at 78° C. They were stored in deionized water until tested.

TABLE VI

| MPD % | AdCl, % | Secs | SP, % | Kw |
|---|---|---|---|---|
| 1.4 | 0.4 | 10 | 1.91 | 14.84 |
|  |  | 30 | 1.80 | 10.82 |
| 2.8 | 0.2 | 10 | 1.33 | 6.00 |
|  |  | 30 | 1.71 | 4.31 |
|  | 0.4 | 10 | 1.96 | 9.33 |
|  |  | 30 | 1.13 | 9.10 |

The results demonstrates the usefulness of the aliphatic diacid chloride in reducing the salt passage of the cycloaliphatic amide system.

Example 7

A microporous polysulfone substrate prepared as in Example 1 was extracted for three minutes in water at 48°-52° C., then soaked in 2.0 w/v% aqueous m-phenylenediamine for three minutes. The surface of the substrate was rolled free of aqueous droplets with a soft sponge rubber roller and immersed for twenty seconds in a solution of 0.16 w/v% of 1,3,5-cyclohexanetricarbonyl chloride in FREON TF. It was then transferred to a second stage of reaction in a solution which contained m-benzenedisulfonyl chloride at the concentrations reported in Table VII for twenty seconds further reaction. The composites were then dried for fifteen minutes in the laboratory air, extracted five minutes in 15% ethanol at 25° C., one minute in water at 45° C., one minute in water at 65° C., and five minutes in water at 75° C., then stored in deionized water until tested at 225 psi with 2.1 g/l sodium chloride.

TABLE VII

| MBSCl, w/v % | Salt Passage, % | Kw, m/s/TPa |
|---|---|---|
| 0.00 | 2.90 | 12.28 |
| 0.03 | 2.14 | 12.95 |
| 0.10 | 1.66 | 9.77 |
| 0.30 | 2.00 | 7.43 |

It should be noted that the decrease in salt passage in combination with retention of flux is obtained at low concentrations of the second reactant.

I claim:

1. A process comprising applying a solution of 1 to 10 weight percent of an aromatic amine having 1 to 2 aromatic rings, containing 6 to 14 carbon atoms and having 2 to 3 amino groups in a first solvent to a microporous substrate, applying a solution of acyl chloride containing on average from 2.2 to 4 acyl chloride groups having aromatic rings, a cyclohexane ring, or mixtures thereof and containing from 8 to 16 carbon atoms in a solvent which is immiscible with said first solvent to said substrate for from 5 to 90 seconds; and applying a second different solution of acyl chloride having an average number of acyl chloride groups of from 2 to 4 attached to either an aromatic nucleus containing 6 to 14 carbon atoms, a cyclohexane nucleus, an alkylene group of 6 to 12 carbon atoms; or a bischloroformate; or mixtures thereof, for 1 to 120 seconds.

2. The process of claim 1 wherein the second different solution is a solution of acyl chloride.

3. The process of claim 2 wherein the diamine is m-phenylene diamine.

4. The process of claim 3 wherein the acyl chloride in the second solution of acyl chloride is an aromatic acyl chloride.

5. The process of claim 4 wherein the first acyl chloride solution contains acyl chloride compound consisting essentially of single ring compounds.

6. The process of claim 5 wherein the acyl chloride compounds in the first acyl chloride solution contain an average from 2.2 to 3 acyl chloride groups per acyl chloride compounds.

7. The process of claim 6 wherein the acyl chloride compounds in the second acyl chloride solution contain an average from 2 to 3 acyl chloride groups per acyl chloride compound.

* * * * *